United States Patent [19]

van der Lely et al.

[11] 4,044,840

[45] Aug. 30, 1977

[54] SOIL CULTIVATING MACHINES

[75] Inventors: Ary van der Lely, Maasland; Cornelis Johannes Gerardus Bom, Rozenburg, both of Netherlands

[73] Assignee: C. van der Lely N. V., Maasland, Netherlands

[21] Appl. No.: 632,688

[22] Filed: Nov. 17, 1975

[30] Foreign Application Priority Data

Nov. 21, 1974 Netherlands .......................... 7415161

[51] Int. Cl.² .................. A01B 33/00; A01B 23/00
[52] U.S. Cl. ..................... 172/59; 172/773; 172/762; 172/744
[58] Field of Search .............. 172/59, 108, 111, 123, 172/773, 774, 775, 762, 49

[56] References Cited

U.S. PATENT DOCUMENTS

| 2,943,687 | 7/1960 | Merry et al. ................ 172/123 X |
| 3,809,166 | 5/1974 | van der Lely et al. ........... 172/59 X |

Primary Examiner—George J. Marlo
Attorney, Agent, or Firm—Mason, Mason & Albright

[57] ABSTRACT

A cultivating machine has a row of soil working members that are driven to rotate about upwardly extending axes. Each member includes an elongated support and the opposite ends of the support each have downwardly extending arms with tine holders in which tines are secured. Each arm is hollow and receives the upper end of a holder that, in turn, receives a tine fastening portion. The arms serve to position the active portions of the tines substantially below their support and the support is thus positioned above ground debris and obstructions.

13 Claims, 3 Drawing Figures

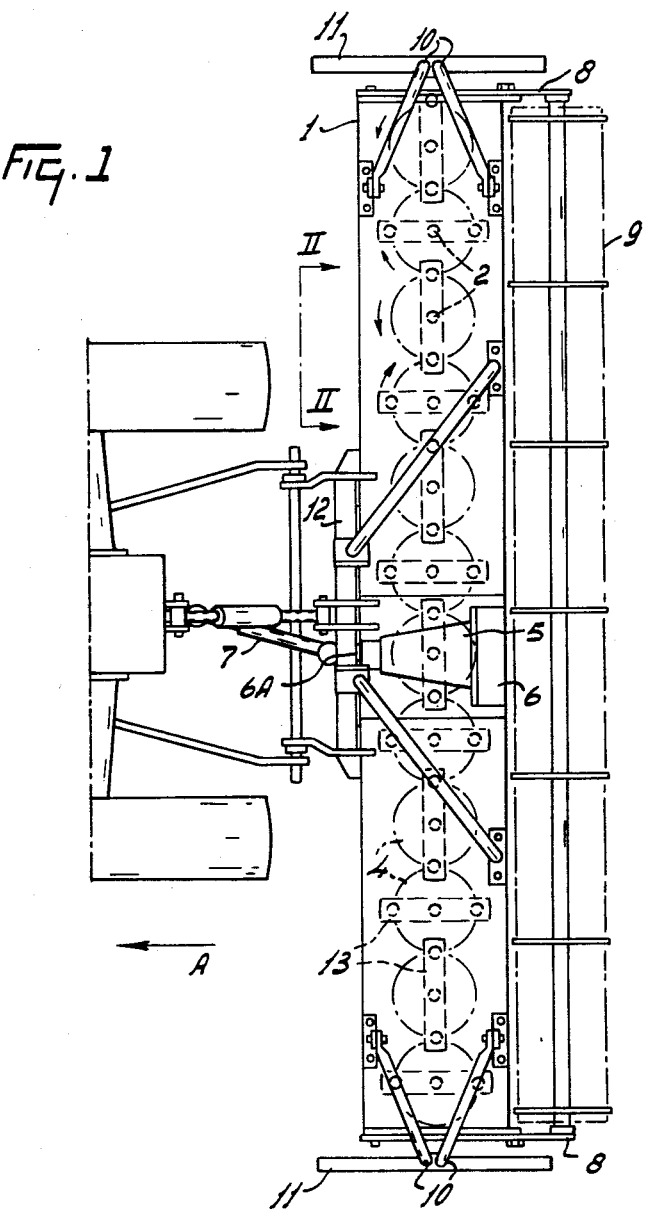

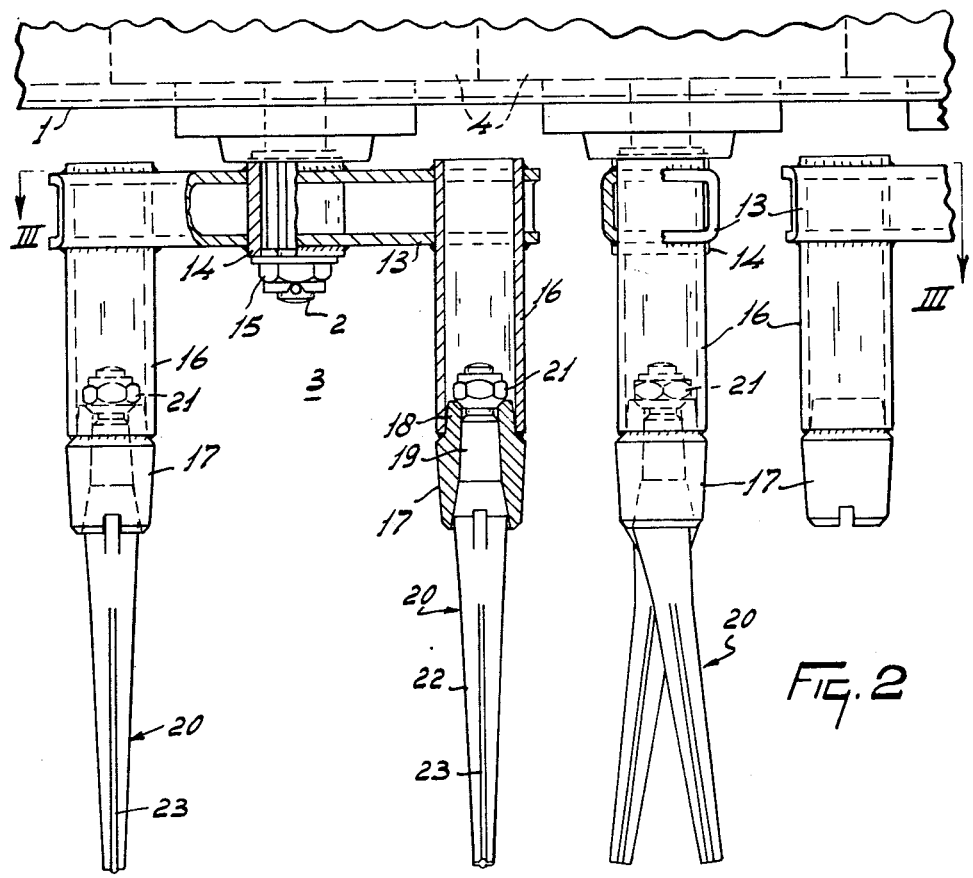
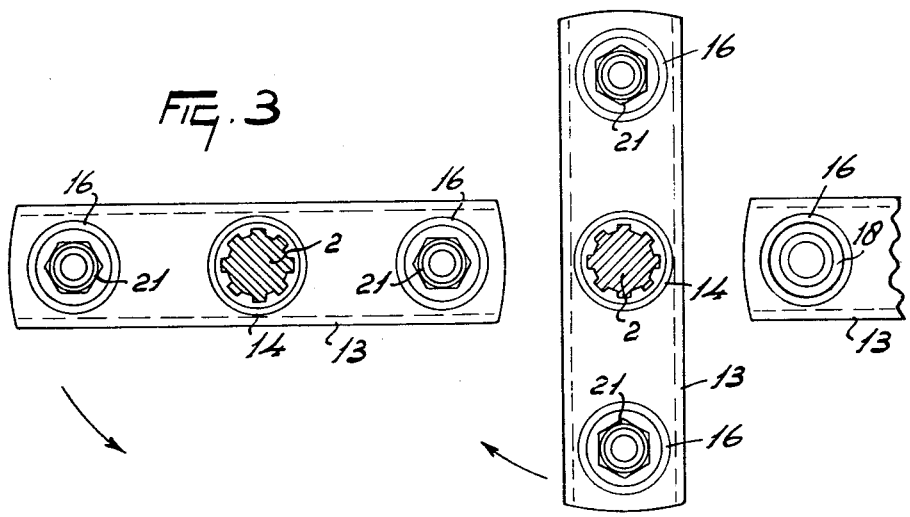

SOIL CULTIVATING MACHINES

For a better understanding of the invention, and to show how the same may be carried into effect, reference will now be made, by way of example, to the accompanying drawings, in which:

FIG. 1 is a plan view of a rotary harrow in accordance with the invention connected to the rear of an agricultural tractor, FIG. 2 is a part-sectional front elevation, to an enlarged scale, as seen in the direction indicated by arrows II—II in FIG. 1, and FIG. 3 is a section taken on the line III—III in FIG. 2.

Referring to the accompanying drawings, the soil cultivating machine or implement that is illustrated is in the form of a rotary harrow which has a hollow box-shaped frame portion 1 that extends substantially horizontally transverse, and normally substantially horizontally perpendicular, to the intended direction of operative travel of the harrow which is indicated in FIG. 1 of the drawings by an arrow A. A plurality of upwardly extending and normally vertical or substantially vertical shafts 2 are rotatably journalled in the hollow frame portion 1 and are arranged in a single row at regularly spaced apart intervals which advantageously have magnitudes of substantially 25 centimeters and whose magnitudes should not be greater than 30 centimeters. In the embodiment which is illustrated somewhat diagrammatically in FIG. 1 of the drawings, there are twelve of the shafts 2 but it will be understood that there may be greater or lesser numbers of those shafts. The lowermost end of each shaft 2 projects from beneath the bottom of the frame portion 1, the downwardly projecting portion thereof having a corresponding soil working member or cultivating member 3, whose construction will be described in greater detail below, firmly but releasably secured to it.

Each of the shafts 2 is provided, inside the hollow frame portion 1, with a corresponding straight-toothed or spur-toothed pinion 4, the teeth of each pinion 4 being in mesh with those of its neighbour, or both of its neighbours, in the single row thereof so that, during operation, each pinion 4, together with the corresponding shaft 2 and soil working member or cultivating member 3, will rotate in the opposite direction to that of its neighbour or both of its neighbours (see the arrows in FIGS. 1 and 3 of the drawings). One of the center pair of shafts 2 has an upward extension through the top of the frame portion 1 into a gear box 5 that is mounted on top of the frame portion. The gear box 5 contains an upper shaft 6A that extends substantially horizontally parallel to the direction A and a lower parallel shaft that is not visible in the drawings. The lower shaft is in driving connection with the extension of one of the shafts 2 that has been referred to above, by way of meshing bevel pinions, and rear ends of both the lower shaft and the upper shaft 6A project through a rear wall of the gear box 5 and into a change-speed gear 6 that is secured to the back of that gear box. The ends of the two shafts that project into the change-speed gear 6 are splined and are arranged to receive chosen pairs of interchangeable and/or exchangeable straight-toothed or spur-toothed pinions. The particular pair of pinions that is chosen, and its arrangement on the two shafts, dictates the transmission ratio between the lower shaft and the upper shaft 6A in the gear box 5 and thus enables the soil working members or cultivating members 3 to be rotated at different speeds without having to alter the input speed of rotation that is applied to the upper shaft 6A. The leading end of the upper shaft 6A projects forwardly from the front of the gear box 5 and is there splined or otherwise keyed to enable it to be placed in driven connection with the power take-off shaft of an agricultural tractor or other operating vehicle through the intermediary of a telescopic transmission shaft 7, which is of a construction that is known per se, having universal joints at its opposite ends.

The opposite ends of the hollow box-shaped frame portion 1 are closed by corresponding substantially vertically disposed sector-shaped end plates and arms 8 are turnable upwardly and downwardly alongside those end plates about strong pivots that are located at the tops and fronts of the end plates with respect to the direction A to define a substantially horizontal axis that is transverse, and normally substantially perpendicular to the direction A. Lowermost and rearmost ends of the arms 8 have a rotatable supporting and crumbling member, in the form of an open ground roller 9, mounted between them so as to be rotatable about an axis that is substantially parallel to the row of soil working members or cultivating members 3 and to the axis about which the arms 8 are upwardly and downwardly turnable relative to the frame portion end plates. The ground roller 9 comprises a central axially extending support that is preferably of tubular construction and a plurality of elongate elements that are arranged at the periphery of the roller at substantially regularly spaced apart intervals around its axis of rotation. The elongate elements are not illustrated in the drawings but extend either parallel to the axis of rotation of the roller 9 or helically around that axis. Rearmost edge regions of the sector-shaped end plates of the frame portion 1 are formed with slots or rows of holes and bolts or equivalent fastening members whose heads can be seen in FIG. 1 of the drawings are entered through single holes in the arms 8 and through said slots or chosen ones of the alternative holes. It will be evident that the bolts or equivalent fastening members can be employed to retain the arms 8, and thus the roller 9, in a chosen angular setting about the pivotal connection of those arms to the frame portion 1 and that the setting which is chosen is a principal factor in determining the depth of penetration of the soil working members or cultivating members 3 into the ground.

Substantially vertically disposed shield plates 11 are located immediately beyond the opposite ends of the single row of soil working members or cultivating members 3 so as to extend substantially parallel to the direction A. A lower edge region of each shield plate 11 is arranged to be slidable over the ground surface in the direction A and each shield plate 11 is secured to a corresponding pair of arms 10 that are pivotably connected to brackets mounted on top of the frame portion 1, the pivotal connections defining substantially horizontal axes that are substantially parallel to the direction A. This arrangement enables the shield plates 11 to turn upwardly and downwardly to some extent to match undulations in the surface of the ground over which the rotary harrow travels during its use, said shield plates 11 serving to minimise ridging of the soil at the edges of the broad strip of land that is worked by the overlapping members 3 and substantially to prevent stones and the like from being flung laterally of the path of travel of the harrow by the rapidly rotating soil working members or cultivating members 3. The two soil working members or cultivating members 3 at the opposite extremities of the row thereof effectively co-operate with the shield plates 11 to these ends. A central region of the front of the frame portion 1 with respect to the direction A is provided with a generally triangular coupling member or trestle 12 that is constructed and arranged for connection to a three-point lifting device or hitch at the rear of an agricultural tractor or other operating vehicle in the generally known manner which is illustrated in outline in FIG. 1 of the drawings.

Each soil working member or cultivating member 3 comprises an upper substantially horizontal support 13 whose center has an internally splined hub 14 that is mounted on a matchingly splined portion of the corresponding shaft 2 that projects from beneath the bottom of the frame portion 1. The fastening assembly is completed by a washer and a nut 15 that is screwed onto a short screwthreaded stub shaft at the extreme lower end of the shaft 2 concerned, a split pin or the like being entered transversely through that stub shaft, after tightening of the nut 15, to prevent vibration during operation from working the nut 15 loose. Opposite end regions of each hollow support 13 are formed with substantially vertically aligned holes in which the upper ends of straight and substantially vertical arms 16 are rigidly secured by upper and lower welds. It can be seen from FIGS. 2 and 3 of the drawings that the arms 16 are of hollow tubular construction, the circular cross-section that is illustrated being preferred but not necessarily essential. The longitudinal axis of each arm 16 is parallel, or substantially parallel, to the combined longitudinal axis and axis of rotation of the corresponding shaft 2. An upper substantially frusto-conically tapered portion 18 of a generally cylindrical tine holder 17 is entered in the lowermost end of each hollow arm 16 and is rigidly retained there by a weld line around the mouth at the lowermost end of the arms. Each holder 17 tapers downwardly in a frusto-conical manner from just beneath the corresponding weld line and its hollow interior, whose longitudinal axis is substantially coincident with that of the corresponding arm 16, receives a fastening portion 19 of a corresponding rigid soil working tine 20. Each tine fastening portion 19 has upper and lower parts that are respectively more steeply, and less steeply, upwardly tapering in a frusto-conical manner. Those parts engage matchingly tapered regions of the interior of the corresponding tine holder 17, the engagement being very firmly, but releasably, maintained by a frusto-conically faced fastening nut 21 that is mounted on a short screw-threaded stub shaft at the extreme uppermost end of the tine fastening portion 19. The frusto-conical face of the nut 21 co-operates with a matching tapered surface at the uppermost end of the hollow interior of the tine holder 17. The upper portion 18 of each holder 17 extends upwardly for a short distance inside the arm 16 with which it co-operates so that the nut 21 and the co-operating screw-threaded stub shaft of the tine fastening portion 19 are completely surrounded by protective means in the form of the arm 16. Although not illustrated in the drawings, it would be possible to construct the arms 16 in such a way that they did not completely surround the nuts 21 and co-operating stub shafts but only partially surrounded them through not less than substantially 180°, the unsurrounded regions of the nuts 21 and co-operating stub shafts being orientated rearwardly with respect to the intended direction of operative rotation of the corresponding soil working members or cultivating members 3. Access to the nuts 21 for tightening and loosening purposes is readily possible by entering a box or socket spanner or wrench into the arm 16 concerned from the open upper end thereof.

Each tine 20 has a lower operative portion 22 whose longitudinal axis is inclined to that of the corresponding fastening portion 19, at the integral junction between those portions, by a small angle which may conveniently have a magnitude of substantially 8°. The tines 20 are mounted in their holders 17, for almost all operations, in such a way that the operative portions 22 thereof are inclined rearwardly from top to bottom relative to the intended directions of rotation of the members 3, said portions 22 thus being disposed in "trailing" positions. Lugs are formed at substantially the junctions between the fastening portions 19 and operative portions 22 of the tines 20 and those lugs co-operate with notches at the lowermost ends of the holders 17 to prevent the tines 20 from turning about the longitudinal axes of their fastening portions 19 in the holders 17 once the nuts 21 have been tightened (see FIG. 2 of the drawings). Each tine operative portion 22 is straight and tapers gently from top to bottom. At least its leading edge (with respect to the intended direction of operative rotation of the corresponding soil working member or cultivating member 3), and preferably also its rear edge, is formed with a rib 23 to assist in effective soil displacement. Each hollow arm 16 has a length which is greater than half the length of the corresponding support 13, the former length conveniently amounting to substantially 20 centimeters. Each tine 20 preferably has a length of between substantially 25 and substantially 30 centimeters and each support 13 preferably has a vertical thickness or depth of substantially 3½ centimeters. The distance between the bottom of each support 13 and the lowermost free end or tip of one of the corresponding tines 20 is thus substantially, but not necessarily exactly, 35 centimeters.

In the use of the rotary harrow that has been described, its coupling member or trestle 12 is connected to the three-point lifting device or hitch at the rear of an agricultural tractor or other operating vehicle in the generally known manner that is illustrated in FIG. 1. The forwardly projecting upper shaft 6A of the gear box 5 is placed in driven connection with the power take-off shaft of the same tractor or other operating vehicle by using the telescopic transmission shaft 7 that has universal joints at its opposite ends. Upon rotating the power take-off shaft of the tractor or other vehicle, the soil working members or cultivating members 3 will be caused to revolve in the directions that are indicated by arrows in FIGS. 1 and 3 of the drawings by operation of the transmission members contained within the gear box 5, the change-speed gear 6 and the hollow frame portion 1. The speed of rotation of the soil working members or cultivating members 3 in response to a substantially standard speed of rotation of the power take-off shaft of the tractor or other vehicle is dictated by disposing an appropriate pair of pinions in the change-speed gear 6. The depth of penetration of the soil working members or cultivating members 3 into the ground is dictated by disposing the roller 9 at an appropriate level with respect to the frame portion 1 by adjustment of the arms 8 and subsequent tightening of the co-operating bolts or equivalent fastening members. These adjustments are performed having regard to the nature and condition of the soil that is to be worked and the soil consistency that is desired after cultivation has been effected. As the rotary harrow is moved operatively over the soil in the direction A, the operative portions 22 of the tines 20 of neighbouring members 3 work overlapping strips of soil to produce, in effect, a single broad strip of worked land. Since the tine holders 17 are located at a significant distance beneath the bottoms of the supports 13, so that the free ends or tips of the tines 20 are located substantially 35 centimeters beneath the lower surfaces of said supports, tines 20 that are standard tines can be employed at a penetration depth of up to 20 centimeters (the normal "maximum" penetration depth), while still leaving a considerable space between the ground surface and the bottoms of the supports 13. With known rotary harrows and other soil cultivating machines or implements, there is a considerable danger of serious damage to supports that generally correspond to the described and illustrated supports 13 when their soil working or soil cultivating members revolve at high speed because the supports are often only just clear of the ground surface and will strike any projecting stones or other hard obstacles that may be very firmly embedded in the soil. The construction that has been described very greatly minimise this danger, even when working in very stony soil, without any disadvantageous effect upon the result that is produced.

Although various features of the rotary harrow that has been described and/or that is illustrated in the accompanying drawings will be set forth in the following claims as inventive features, it is emphasised that the invention is not necessarily limited to those features and that it includes within its scope each of the parts of the rotary harrow that has been described, and/or that is illustrated in the accompanying drawings, both individually and in various combinations.

What is claimed is:

1. A soil cultivating machine comprising a frame and a plurality of soil working members rotatably mounted on upwardly extending shafts that are positioned in a row extending transverse to the direction of travel of said machine, and driving means connected to rotate said shafts, each soil working member comprising a substantially horizontal support at the lower end of a corresponding upwardly extending shaft and at least one elongated, downwardly extending arm depending from said support, said arm being spaced from said shaft and extending downwardly in a direction substantially parallel to that of said shaft, the lower end of said arm comprising a sleeve-like holder and a tine secured in said holder, said tine having a lower active portion and an upper fastening portion, said fastening portion being secured in said holder by fastening means and said active portion extending downwardly below the holder, said fastening means being located within said arm, and the upper end of said fastening portion terminating adjacent the lower end of said arm, said support being normally positioned substantially above the soil being worked by the active tine portion to avoid impact damage from debris in and on the ground.

2. A machine as claimed in claim 1, wherein said fastening portion is a tapered structure and said holder affords protective means that at least partly encircles that structure.

3. A machine as claimed in claim 2, wherein said protective means completely surrounds said structure.

4. A machine as claimed in claim 1, wherein said arm is substantially circular in cross-section.

5. A machine as claimed in claim 4, wherein said arm and said holder have substantially the same cross-sectional shape.

6. A machine as claimed in claim 1, wherein said arm is substantially straight.

7. A machine as claimed in claim 1, wherein said fastening portion has a longitudinal axis that substantially coincides with the longitudinal axis of said arm.

8. A machine as claimed in claim 7, wherein said arm extends substantially parallel to the axis of rotation of said soil working member.

9. A machine as claimed in claim 1, wherein said support has a hole adjacent an end thereof and an upper end of said arm is secured within said hole.

10. A machine as claimed in claim 9, wherein said arm is hollow and said holder has an upper portion that extends into the interior of said arm.

11. A machine as claimed in claim 10, wherein said fastening portion comprises a screw threaded stub shaft that is secured in said holder by a nut.

12. A machine as claimed in claim 1, wherein the active portion of said tine has a longitudinal axis that is inclined to a longitudinal axis of said fastening portion and the former extends in a trailing position with respect to the normal direction of rotation of the corresponding soil working member.

13. A soil cultivating machine comprising a frame and a plurality of soil working members rotatably mounted on upwardly extending shafts that are positioned in a row extending transverse to the direction of travel of said machine, and driving means connected to rotate said shafts, each soil working member comprising a substantially horizontal support at the lower end of a corresponding upwardly extending shaft and an elongated, downwardly extending arm depending from adjacent each opposite end of said support, said arm being spaced from and extending downwardly in a direction substantially parallel to that of said shaft, the lower end of said arm being hollow and comprising a sleeve-like holder, a tine fitted in said holder, said tine having a lower active portion and an upper fastening portion, said fastening portion being secured in said holder by fastening means and said active portion extending downwardly below the holder, said fastening means being located within said arm and the upper end of said fastening portion terminating adjacent the lower end of said arm, said support being normally positioned substantially above the soil being worked by the active tine portion to avoid impact damage from debris in and on the ground.

* * * * *